US011693780B2

(12) United States Patent
Subramoney et al.

(10) Patent No.: US 11,693,780 B2
(45) Date of Patent: Jul. 4, 2023

(54) SYSTEM, METHOD, AND APPARATUS FOR ENHANCED POINTER IDENTIFICATION AND PREFETCHING

(71) Applicant: Intel Corporation, Santa Clara, CA (US)

(72) Inventors: Sreenivas Subramoney, Bangalore (IN); Stanislav Shwartsman, Haifa (IL); Anant Nori, Bangalore (IN); Shankar Balachandran, Bangalore (IN); Elad Shtiegmann, Kefar Sava (IL); Vineeth Mekkat, San Jose, CA (US); Manjunath Shevgoor, San Jose, CA (US); Sourabh Alurkar, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 15 days.

(21) Appl. No.: 17/391,962

(22) Filed: Aug. 2, 2021

(65) Prior Publication Data

US 2021/0365377 A1 Nov. 25, 2021

Related U.S. Application Data

(63) Continuation of application No. 16/234,135, filed on Dec. 27, 2018, now Pat. No. 11,080,194.

(51) Int. Cl.
*G06F 12/0862* (2016.01)
(52) U.S. Cl.
CPC .... *G06F 12/0862* (2013.01); *G06F 2212/602* (2013.01)

(58) Field of Classification Search
None
See application file for complete search history.

(56) References Cited

U.S. PATENT DOCUMENTS

| 5,050,068 A | 9/1991 | Dollas et al. |
| 2018/0074965 A1 | 3/2018 | Aguilera et al. |
| 2019/0087192 A1 | 3/2019 | Priyadarshi et al. |

OTHER PUBLICATIONS

Final Office Action, U.S. Appl. No. 16/234,135, dated Oct. 8, 2020, 10 pages.

(Continued)

*Primary Examiner* — Charles J Choi
(74) *Attorney, Agent, or Firm* — Nicholson De Vos; Webster & Elliott LLP

(57) ABSTRACT

System and method for prefetching pointer-referenced data. A method embodiment includes: tracking a plurality of load instructions which includes a first load instruction to access a first data that identifies a first memory location; detecting a second load instruction which accesses a second memory location for a second data, the second memory location matching the first memory location identified by the first data; responsive to the detecting, updating a list of pointer load instructions to include information identifying the first load instruction as a pointer load instruction; prefetching a third data for a third load instruction prior to executing the third load instruction; identifying the third load instruction as a pointer load instruction based on information from the list of pointer load instructions and responsively prefetching a fourth data from a fourth memory location, wherein the fourth memory location is identified by the third data.

18 Claims, 17 Drawing Sheets

(56) References Cited

OTHER PUBLICATIONS

Non-Final Office Action, U.S. Appl. No. 16/234,135, dated Apr. 7, 2020, 14 pages.
Notice of Allowance, U.S. Appl. No. 16/234,135, dated Apr. 9, 2021, 9 pages.

| LOAD IDENTIFIER | ACCESSED DATA | ACCESSED LOCATION | CONFIDENCE LEVEL | POINTER? |
|---|---|---|---|---|
| LOAD 1 | DATA 1 | MEM ADDR 1 | 3 | YES |
| LOAD 2 | DATA 2 | MEM ADDR 2 | 1 | NO |
| LOAD 3 | DATA 3 | MEM ADDR 3 | 0 | NO |
| ... | ... | ... | ... | ... |
| LOAD N | DATA N | MEM ADDR N | 0 | NO |
| ... | ... | ... | ... | ... |

FIG. 5

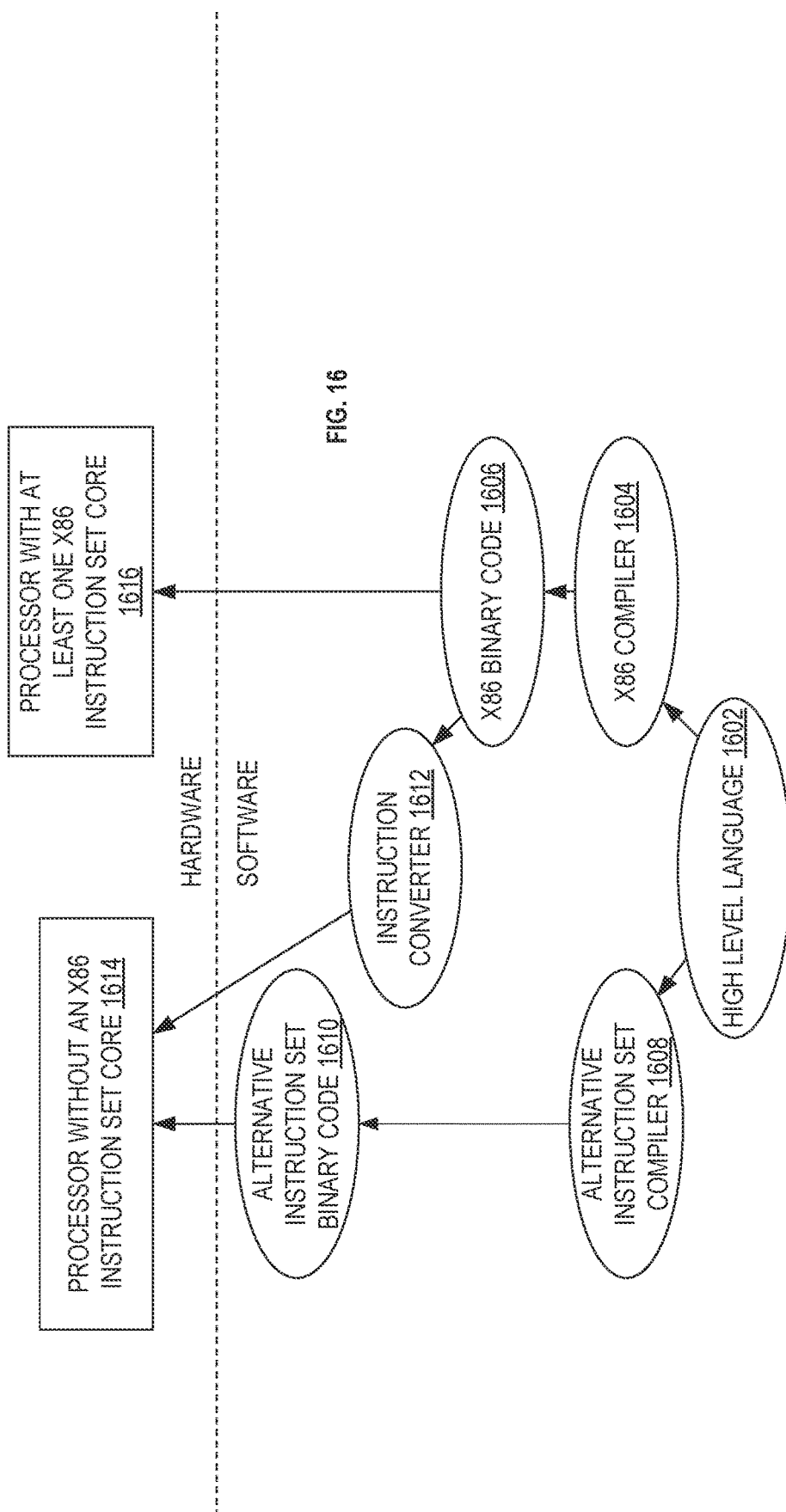

SYSTEM, METHOD, AND APPARATUS FOR ENHANCED POINTER IDENTIFICATION AND PREFETCHING

TECHNICAL FIELD

Embodiments of the invention described herein relate generally to the field of data prefetching logic and architecture in a computer processing system. In particular, the disclosure relates to enhanced pointer identification and prefetching.

BACKGROUND ART

Cache prefetching is a technique employed by computer processors to increase performance by preemptively fetching data from relatively slower storage locations (e.g., system memory) to faster storage locations (e.g., cache) before they are requested by the processors for execution. Prefetching enables portions of the memory access latency to be overlapped and thereby reduces the overall data access time.

While cache prefetching techniques have improved significantly over the years, prefetchers tend to perform poorly with respect to identifying and prefetching data referenced by pointers. A pointer is an object in memory that stores the memory address of another memory location containing the real data (i.e. pointer-referenced data). To obtain pointer-referenced data, two memory accesses are required. A first access to retrieve the pointer in order to obtain the address of the memory location containing the real data and then a second access to retrieve the real data from the memory location. The difficulty in prefetching pointer-referenced data is that the second access depends on the pointer from the first access. Given that the pointer may be pointing to random memory locations (e.g., dynamically allocated memory) with no easily discernable pattern, conventional prefetchers, such as a stride prefetcher, are typically inaccurate and inefficient when prefetching pointer-referenced data.

BRIEF DESCRIPTION OF THE DRAWINGS

The invention may best be understood by referring to the following description and accompanying drawings that are used to illustrate embodiments of the invention. In the drawings:

FIG. 5 is an embodiment of the load instruction storage (LIS);

FIG. 16 illustrates a block diagram contrasting the use of a software instruction converter to convert binary instructions in a source instruction set to binary instructions in a target instruction set according to embodiments of the invention.

DETAILED DESCRIPTION

Embodiments of system, method, and processor for prefetching pointer-referenced data, particularly with respect to an array of pointers, are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. For clarity, individual components in the Figures herein may be referred to by their labels in the Figures, rather than by a particular reference number.

The most complex part about prefetching pointer-referenced data is identifying the relationship between the load instruction that reads the pointer (pointer load) and the load instruction that uses the pointer to read the desired data (data load). A widely used memory access pattern utilizing pointer-referenced data is an array of pointers (AOP). The AOP pattern is characterized by repeating pairs of memory accesses where the target of a later memory access (data load) is dependent on the data of a prior memory access (pointer load).

Figure 1:
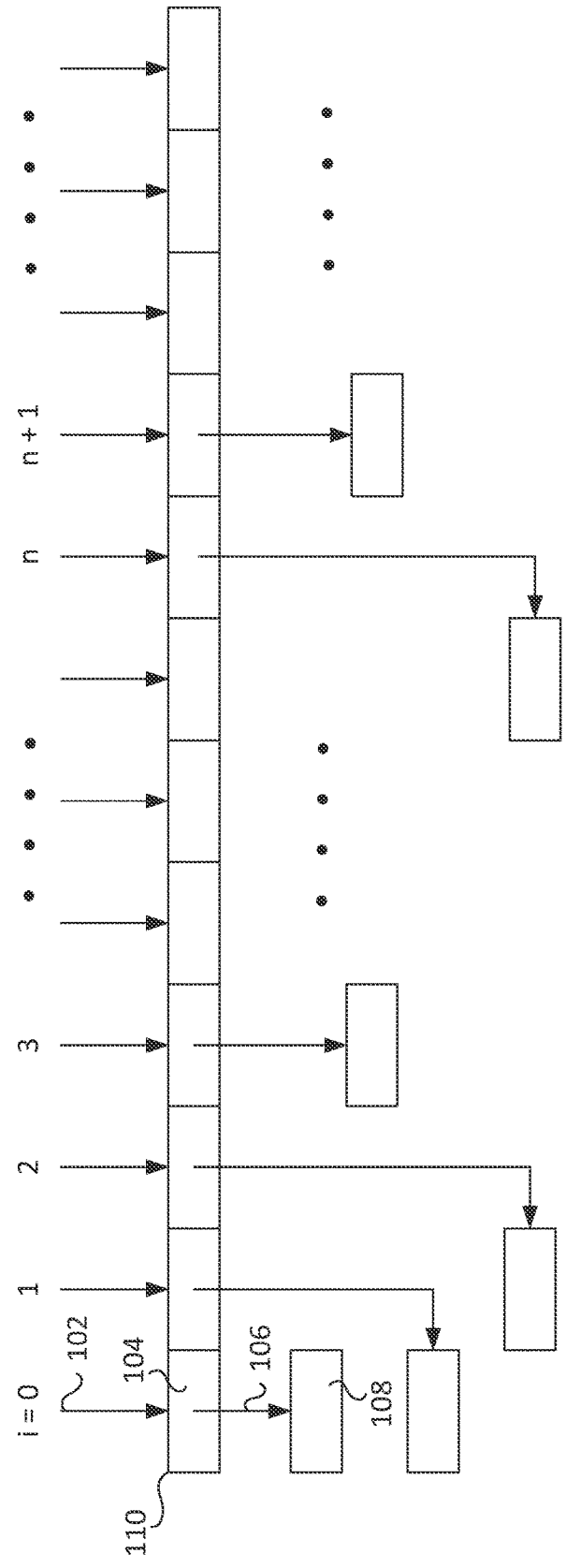
FIG. 1 illustrates an exemplary AOP access pattern according to an embodiment.

FIG. 1 illustrates an exemplary AOP access pattern. On each iteration of <i>, a first load 102 accesses data stored in a first memory location 104. A second load 106 then accesses data stored in a second memory location 108 based on the data from the first memory location 104. Specifically, the target 108 of the second load 106 (data load) is identified by the value of the data (e.g., treated as a memory address) from the first load 102 (pointer load). Thus, the execution of the second load 106 is dependent on the data obtained from the first load (102). What this also means is that, without data prefetching, the second load 106 cannot begin execution until after the first load 102 has finished getting the data 104. This creates unnecessary latency.

As illustrated, in an AOP access pattern, each cell (e.g., 104) of the array of pointers 110 is typically accessed sequentially via pointer loads 102. According to an embodiment, this sequential access pattern can be detected easily and prefetched via a suitable prefetcher, such as a stride prefetcher. The same, however, cannot be said for the data loads (e.g., 106). Unlike the pointers in an array, the targets of the data loads are hard to predict because they can locate in random memory locations (e.g., dynamically allocated memory) with no easily discernable pattern. As such, data loads are slow to execute as the location of their targets are known only after their corresponding pointer loads have finished executing. Aspects of the present invention are directed to reducing the latency inherent in the execution of data loads by eliminating the need to wait on the execution of the pointer loads. Instead, the data required for the data load is prefetched and made available as soon as the data for the pointer load is prefetched. This means the data load does not have to wait for the completion of the actual execution of the pointer load. Another aspect of the present invention is directed to systems and methods for identifying pointer load instruction based on the relationship between pointer load instructions and data load instructions.

A method embodiment for performing AOP prefetching includes 3 stages—training, prediction, and prefetch. In the training stage, information associated a number of load instructions are stored in a load instructions storage (LIS). The LIS may include any suitable data structure to store information, such as a database, lookup table, array, linked list, etc. The load instructions stored in the LIS may be instruction that have been executed previously. The information stored in the LIS for each instruction may include an identifier for the instruction (e.g., a program counter or an instruction pointer), the data accessed by an execution of the instruction, the memory address or location of the access . . . etc. The stored information is then used to detect possible pointer-data load relationships in an access pattern. For example, when a new load instruction is detected, the predictor compares the target address of the new load instruction with the data stored in the LIS. In one embodiment the data from each entry of the LIS is treated as a memory address for the comparison. A match may be detected when the two memory addresses are an exact match. In other embodiments, a match may be found when the two memory addresses are in the same cache line or cache block. Upon detecting a match, the matching load instruction in the LIS may be marked as a pointer load instruction or may be added to a list of pointer load instructions. In some embodiments, each entry is associated with a confidence level counter. Each time a match is found in the LIS, the confidence level of the entry is incremented. When the confidence level exceeds a predetermined threshold, the entry is marked as a pointer load instruction. As for the new load instruction, it may be marked a data load instruction in embodiments that track data load instructions. If no match is found, the new load instruction may itself be a pointer load instruction candidate and is thus added to the LIS for future comparison.

In the prediction stage, when a load instruction is detected, it is checked against the load instructions in the LIS, or the list of pointer load instructions if one is used, to see if it is a pointer load instruction. If the load instruction has been marked as a pointer load instruction from the training stage, the load instruction is predicted as a pointer load instruction.

In the prefetch stage, when an incoming load instruction has been predicted as a pointer load instruction, two prefetches are issued. A first prefetch request is issued for target address of the load instruction ahead of its execution. When the first prefetch completes, the prefetched data is treated as a target address for a second prefetch. The second prefetch effectively brings the data to be accessed by a second load instruction (data load) into the local cache. When the second load instruction ultimately reaches execution, the data it requires would be available in the local cache.

Figure 2:
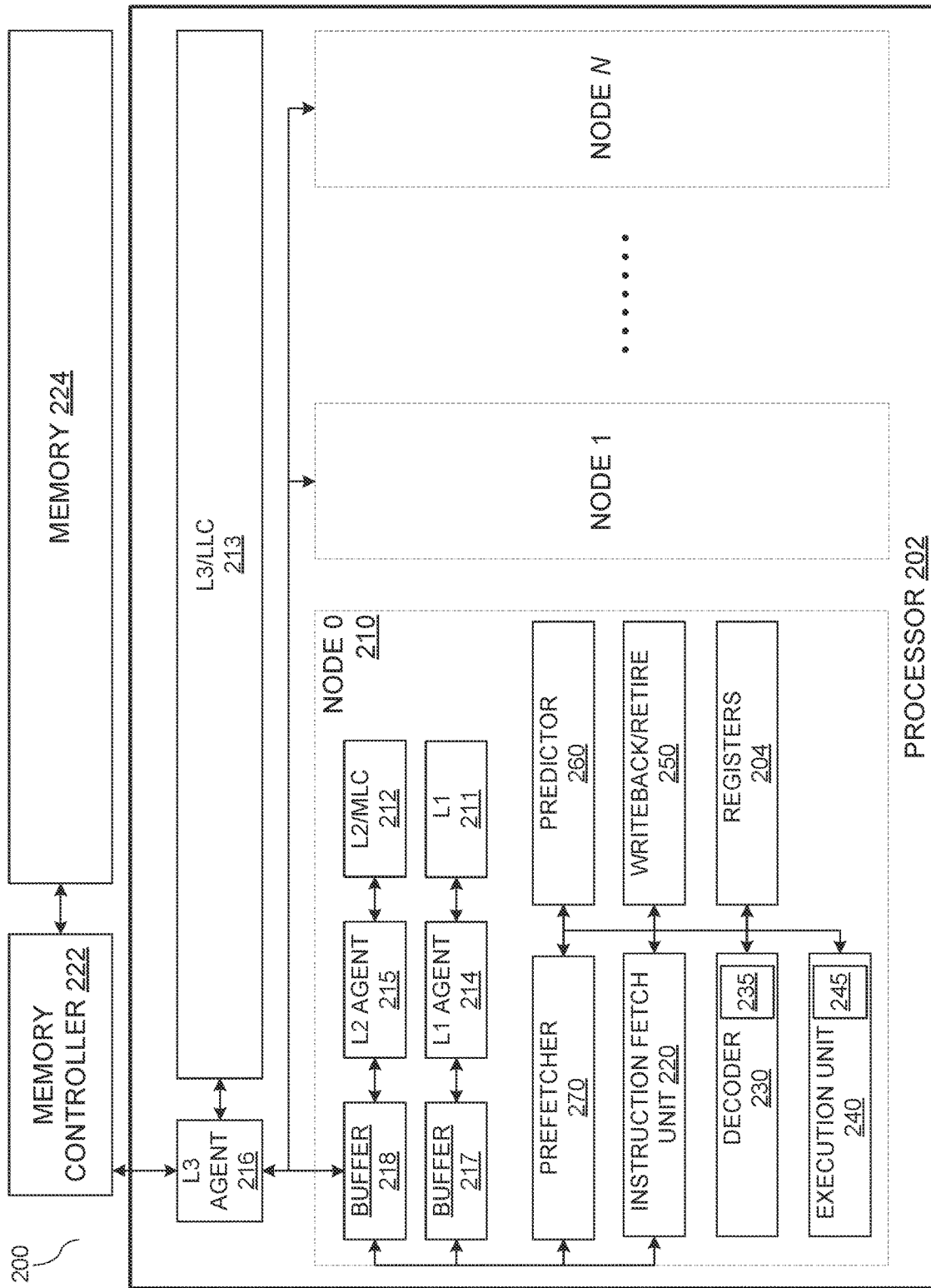
FIG. 2 is a block diagram illustrating an exemplary system on which embodiments of the present invention may be implemented.

FIG. 2 illustrates an exemplary system on which embodiments of the present invention may be implemented. System 200 includes processor 202 communicatively coupled to memory 224 via memory controller 222. Processor 202 may be a chip multi-processor (CMP) that includes one or more nodes (node 0-N). Each of the nodes may constitute or include a processor core (core), a logical processor, or a hardware thread. For simplicity, only a node 0 210 is illustrated in detail. It will be understood, however, that each of the other nodes 1-N may have the same set of logics, components, circuitries, and/or configurations as node 0. For example, each node may include a set of registers 204, a level 1 cache (L1) 211, and a L2 (L2) or mid-level cache (MLC) 212. In some embodiments, processor 202 may further include a level 3 (L3) cache or last level cache (LLC) 213 which is communicatively coupled to, and shared by, all of the nodes. In other embodiments, the L3/LLC 213 is physically distributed and logically shared among the nodes (not shown). Each of L1, L2/MLC, and L3/LLC caches, according to an embodiment, is managed by a respective cache agent or controller (214-216) and is usable for caching instructions and data according to a specified cache management policy. One or more cache agents or controllers may be used to perform the functions of a home agent, which may utilize directories to ensure and enforce cache coherence. In at least some embodiments, the cache management policy further includes a cache eviction/replacement policy. In some embodiments, each of the caches may also have associated with it one or more buffers (217-218), such as stream buffers and fill buffers, that may temporarily store the data returned from prefetches and/or other memory access requests before the data is cached. Each buffer may be associated with a respective eviction/replacement policy.

The instructions and data stored within the various processor caches and buffers are managed at the granularity of cache lines or cache blocks which may be a fixed size (e.g., 64, 128, 512 Bytes in length). Each node of the exemplary embodiments further includes an instruction fetch unit 220 for fetching instructions from main memory 224 via memory controller 222 and/or from the shared LLC 213 via L3/LLC agent 216; a decoder 230 for decoding the instructions (e.g., decoding program instructions into micro-operations or "uops"); an execution unit 240 for executing the decoded instructions; and a writeback unit 250 for retiring the instructions and writing back the results (e.g., to main memory 224). Furthermore, decoder 230 may include specific logic or circuitry 235 to decode instructions, such as a load instruction (including pointer load instructions), into micro-operations. Similarly, the execution unit may also include specific logic or circuitry 245 to execute the decoded instructions by performing various operations. The instruction may include one or more operand. At least one of the operands may specify the memory address of a cache line from which data is to be accessed.

According embodiments of the present invention, node 0 210 of processor 202 further includes a predictor 260 that is communicatively coupled to a prefetcher 270. The predictor may be implemented hardware circuits or circuitry, or a state machine. While shown as separate components, in some embodiments, the predictor and the prefetcher may be a single component. For example, the functions of the predictor may be integrated into the prefetcher. Moreover, although only a single prefetcher is shown for node 0, it will be appreciated that node 0 may include multiple prefetchers, each of which is associated with a cache (e.g., L1/L2/last level cache). Each of the prefetchers may also be associated with one or more respective predictors. According to an embodiment, the predictor 260 monitors memory accesses and tracks load instructions executed by the execution unit 240. The predictor 260 then uses this information to identify potential pointer load instructions. When a subsequent instance of an identified pointer load instruction is detected, the predictor 260 instructs the prefetcher 270 to prefetch not only the pointer but also the data referenced by the pointer.

According to an embodiment, the predictor 260 tracks a plurality of load instructions that have been executed by the execution unit 240 along with the data accessed or returned as a result of the executions. Using this information, the predictor can identify the load instructions that are most likely to be pointer load instructions. Specifically, when a target of a subsequent load instruction matches the pointer of a tracked load instruction, that tracked load instruction is likely a pointer load instruction. The tracked load instruction may be marked as a pointer load instruction or be added to a list of pointer load instructions. In some cases, a confidence level associated with the tracked load instruction is incremented. When the prefetcher detects a subsequent instruction that has been identified as a pointer load instruction, the prefetcher would prefetch the pointer as well as the pointer-referenced data.

Figure 3:
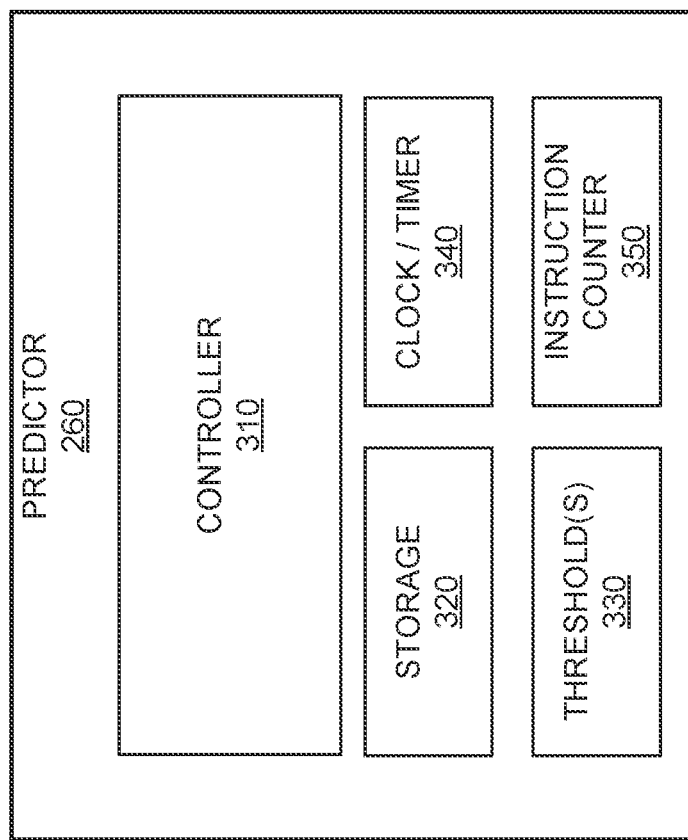
FIG. 3 is a block diagram illustrating an embodiment of a predictor.

FIG. 3 is a block diagram illustrating an embodiment of a predictor. Predictor 260 includes a controller 310, storage unit 320, threshold storage unit 330, clock/timer circuitry 340, and instruction counter circuitry 350. The controller 310 controls and manages the operations of the predictor. The storage unit 320 provides storage for various data and information required by the controller to perform the functions of the predictor. It includes storage for the LIS for storing the tracked load instruction. It may also store a list of pointer load instructions and/or a list of data load instructions. The threshold storage unit 330 stores one or more thresholds used by the controller, such as a confidence level threshold for determining whether a load instruction should be deemed a pointer load instruction. The clock/timer circuitry 340 provides time and/or clock cycle information to the controller 310. In one embodiment, the confidence level for each load instruction may be decremented upon each expiration of a timer or passage of a certain number of clock cycles. The instruction counter 350 tracks the number of instructions that have been detected and/or executed. According to an embodiment, the confidence level for each load instruction may be decremented each time a certain number of load instructions have been detected or executed.

Figure 4A:
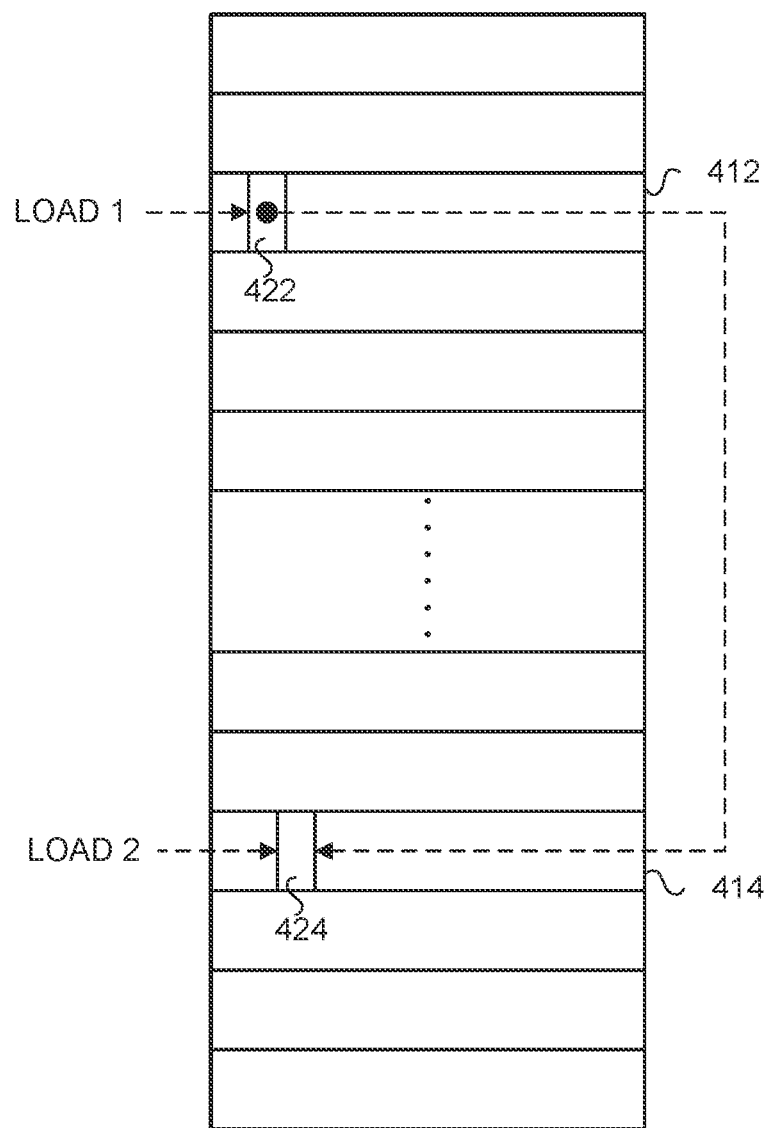
FIGS. 4A and 4B illustrate examples of a match between a memory location accessed by a data load instruction and a memory location identified by a pointer load instruction, according to embodiments.
Figure 4B:
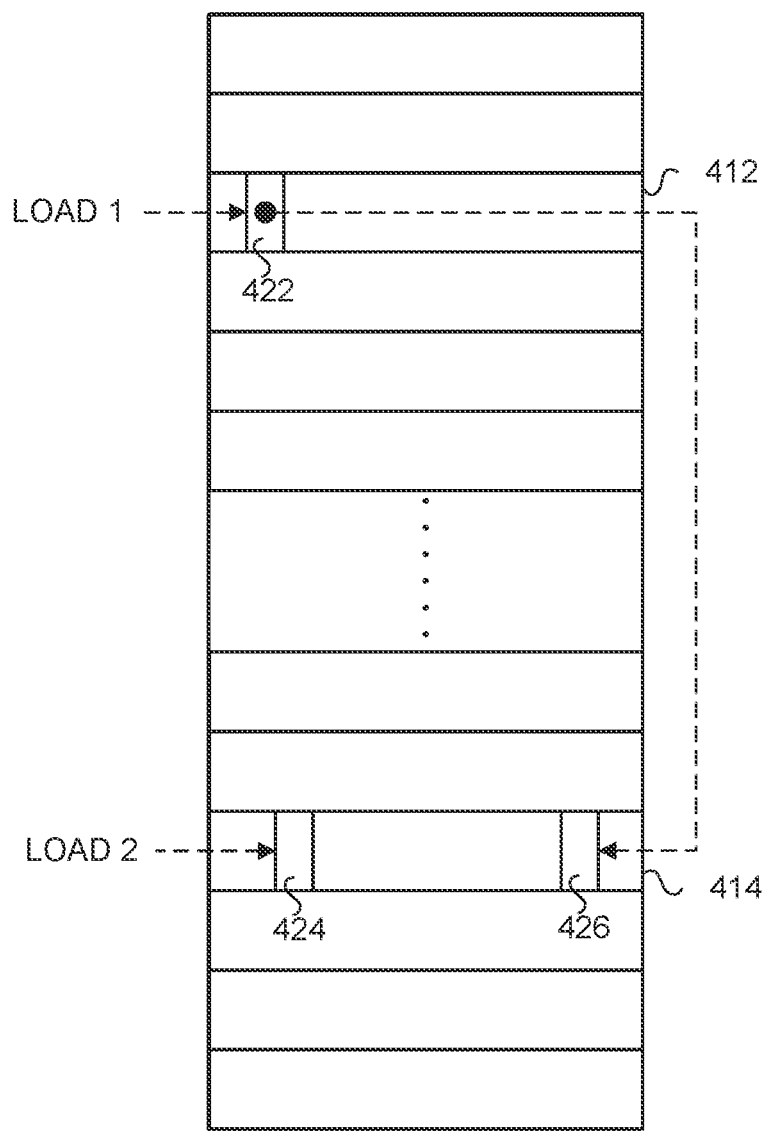

FIGS. 4A and 4B illustrate examples of a match between a memory location accessed by a data load instruction and a memory location identified by a pointer load instruction, according to embodiments of the present invention.

In FIG. 4A, a first load instruction (LOAD 1) accesses data in memory location 422 of cache line 412. The data in memory location 422 includes a memory address pointing to another memory location 424 in cache line 414. A second load instruction (LOAD 2) also accesses that same memory location 424. In this case, LOAD 1 and LOAD 2 would be considered a match if the target address of LOAD 2 and the addressed stored in memory location 422 are an exact match.

In FIG. 4B, LOAD 1 accesses the data in memory location 422 which points to memory location 426 in cache line 414 while LOAD 2 accesses memory location 424. While memory locations 424 and 426 are different memory locations, this may still be considered a match according to some embodiments because the two memory locations are located in the same cache line 414. The reason behind this broader definition of a match is because data is typically prefetches by an entire cache line or cache block. While LOAD 1 and LOAD 2 do not access the exact same memory location, it would still be beneficial to prefetch data for LOAD 2

FIG. 5 is an embodiment of the load instruction storage (LIS) to track information of past load instructions used for identifying pointer load instructions. While a table is illustrated, it can be appreciated that the LIS may implemented with any suitable data structure. According to an embodiment, each entry of LIS 500 comprises one row and corresponds to a load instruction. Each entry includes a load identifier field 512 to store an identifier which uniquely identifies the corresponding load instruction. The load identifier may be a program counter or an instruction pointer associated with the load instruction. Each entry further includes an accessed data field 514 to store the data read or otherwise accessed by the corresponding instruction. The data may include a pointer or a memory address to a memory location. The data in accessed data field 514 is later used to match the memory addresses of subsequent load instructions for identifying potential pointer load instructions. As disclosed above, a match between the accessed data stored in the accessed data field and a memory address of a subsequent load instruction would indicate that the load instruction corresponding to the accessed data is a pointer load instruction.

An accessed location field 516 may also be included for each entry and is used to store the memory address of location that was accessed by the corresponding load instruction. In some embodiments, a confidence level field 518 is maintained for each tracked load instruction in the LIS. Each time a tracked load instruction is identified as a pointer load instruction by a subsequent load instruction, the confidence level is incremented. On other hand, the confidence level may be decremented after a certain amount of time or number of clock cycles have passed, or after a predetermined number of load instructions have been detected or executed. According to an embodiment, when the confidence level exceeds a threshold, the corresponding load instruction is marked as a pointer load instruction. Conversely, when the confidence level dips below the threshold, the corresponding load instruction may no longer be considered a pointer load instruction. A pointer field 520 may be included in the entry to indicate which of the tracked load instructions are pointer instructions. The pointer field may indicate to the prefetcher that the corresponding load instruction is to be treated as a pointer load instruction. Thereafter, whenever an instance of the identified pointer load instruction is detected, two prefetch requests are triggered—one for the pointer and one for the pointer-referenced data. According to some embodiments, load instructions that have been identified by the predictor as pointer load instructions may be stored in a list of instructions that is separate from the LIS.

Figure 6:
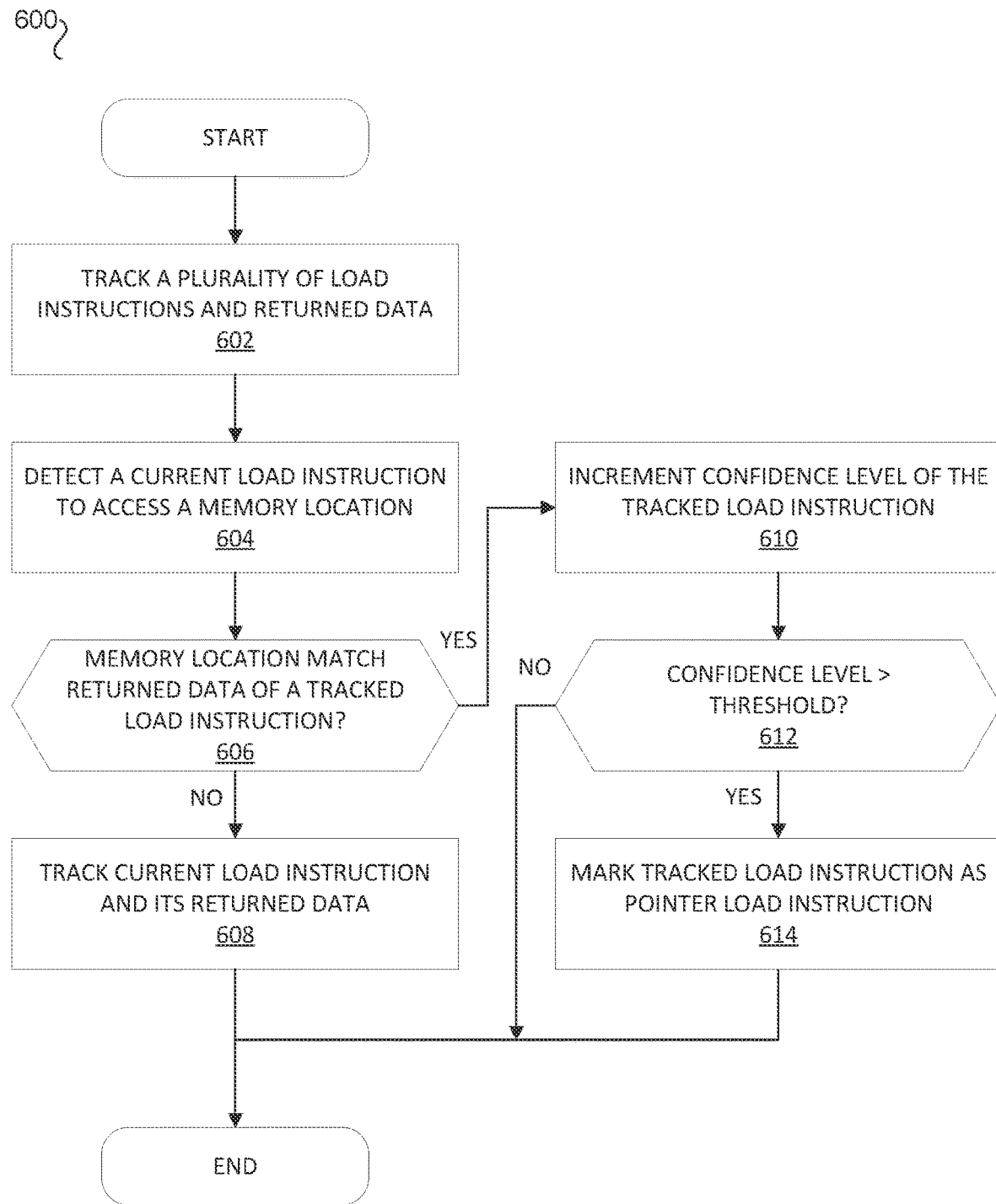
FIG. 6 is a flow chart illustrating the operations and logic for implementing a predictor according to an embodiment.

FIG. 6 is a flow diagram illustrating an embodiment of a method for identifying a pointer load instruction. Method 600 may be performed or implemented by a predictor, such as predictor 260 of FIG. 2. The method begins at the start block and continues to block 602, where one or more prior load instructions and their respective returned data are tracked. A storage unit, such as the LIS described above, may be used to store the tracked information. At block 604, an execution of a current load instruction to access a memory location is detected. At block 606, a determination is made on whether the memory location to be accessed by the current load instruction matches the data of any of the prior load instructions. In one embodiment, a match is found when the address of the memory location to be accessed by the current load instruction and the data associated with one of the prior load instructions, when taken as a memory address, are an exact match. Alternatively, or in addition to, a match may be found simply when the two addresses reside in the same cache line or cache block. When no match is found, the current load instruction is executed as normal. In one embodiment, the current load instruction and the data returned from its execution are added to the list of load instructions being tracked at block 608. On the other hand, if a match was found in block 606, the method continues to block 610 where a potential pointer load instruction has been identified. According to an embodiment, a confidence level associated with the prior load instruction that has been identified as a pointer load instruction is incremented. At block 612, a determination is made on whether the confidence level associated with the prior load instruction has exceeded a threshold. If so, the identified prior load instruction is marked as a pointer load instruction at block 614, such as by updating the pointer field 518 of the prior load instruction in the LIS. If a separate list of pointer load instruction is used, then the identifier for the prior load instruction is added to the list. If, however, the confidence level does not exceed the threshold at block 612, then the process ends. While a confidence level is illustrated in FIG. 6, in embodiments where a confidence level is not used, the prior load instruction may simply be marked as a pointer load instruction or be added to a list of pointer instructions upon a first match. In other words, blocks 610 and 612 are optional and only applicable if the confidence level is being tracked.

Figure 7:
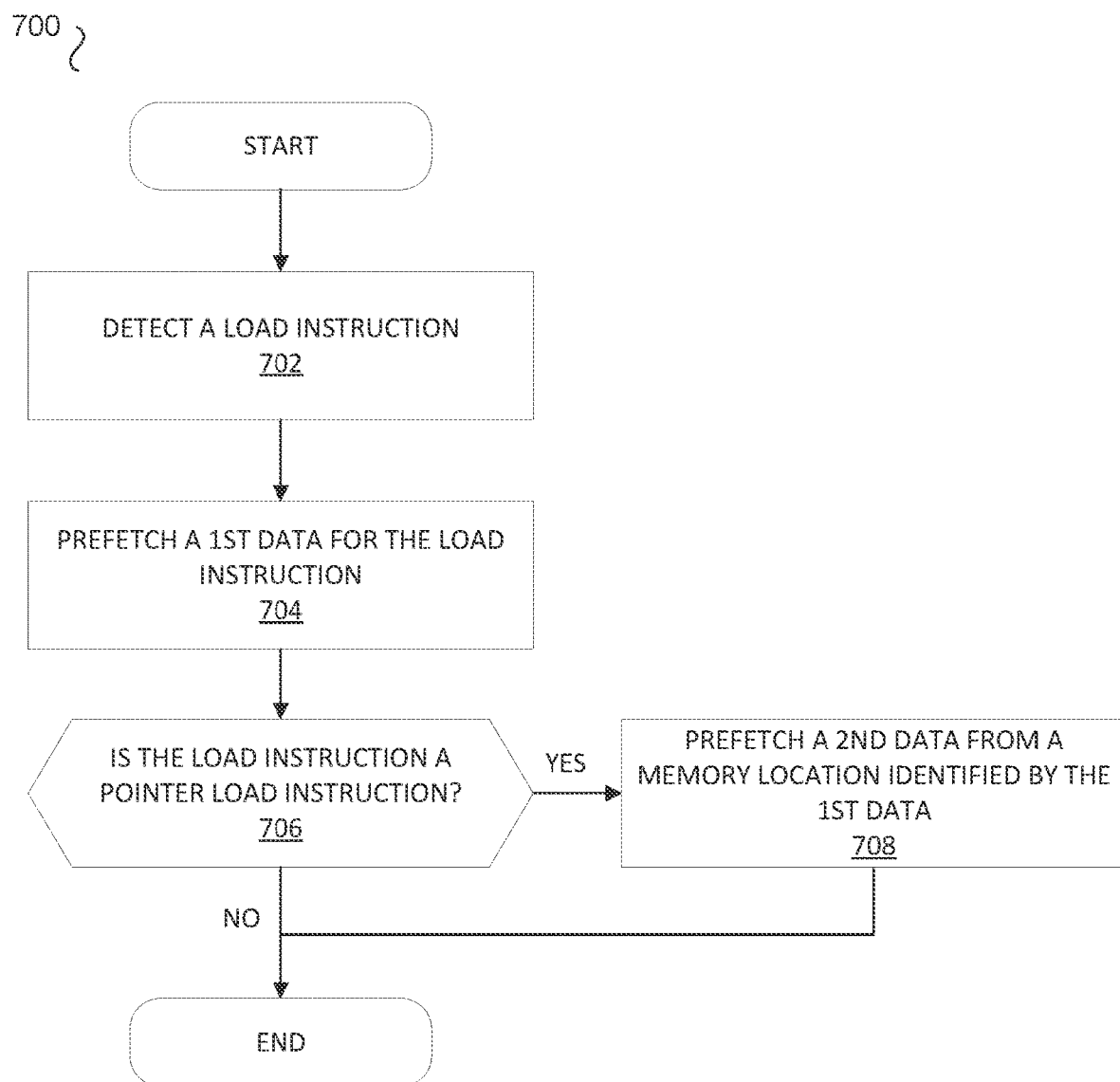
FIG. 7 is a flow chart illustrating the operations and logic for implementing a data prefetcher according to an embodiment.

FIG. 7 is a flow diagram illustrating an embodiment of a method for prefetching pointer and pointer-referenced data. Method 700 may be performed or implemented by a prefetcher, such as prefetcher 270 of FIG. 2. The method 700 begins at the start bock and continues to block 702, where a load instruction to be executed by an execution unit is detected. In one embodiment, the load instruction may be issued by the prefetcher as part of the prefetcher algorithm. Upon detecting the load instruction, a first data is prefetched for the load instruction at block 704. At block 706, a determination is made on whether the load instruction is a pointer load instruction. In one embodiment, the determination is made based on information stored in the LIS or the list of pointer instructions. Specifically, the program counter or instruction pointer of the load instruction is compared with the entries in the LIS. When a matching entry is found, the value of the pointer field (518 of FIG. 5) is used to determine if the load instruction is a pointer load instruction. If the load instruction is a pointer load instruction, then at block 708, a second data is prefetched from a memory location identified by the first data. In one embodiment, the first data includes a memory address that points to a memory location containing the second data. If the load instruction is not a pointer load instruction, then the process ends.

While the systems and methods are described above in the context of AOP pattern, it will be appreciated that they may be applied to any pointer and pointer-referenced data. However, using a hardware prefetcher to identify the relationship between pointer load and data load may be costly in terms of power and area. Hardware prefetchers are also limited in the types of relationship between the pointer and data that can be discovered. While difficult to identify in a hardware prefetcher, such relationship may be readily available or easily determined from the original program code. In one embodiment, the task of finding the point-data relationship is performed mostly or entirely in software. In doing so, more complex relationships or patterns between pointer and data loads can be identified and used during execution. In one embodiment, such functionality is achieved via a software predictor. The software predictor may include, or be communicatively coupled to, a combination compiler. The software predictor may also be capable of performing binary translation including dynamic binary translation (DBT). In an embodiment, the software predictor may perform the functions of an instruction converter described below. Furthermore, existing instruction set architecture (ISA) may be augmented with a special instruction, which when detected, triggers prefetches for the pointer load as well as the data load. The special instruction may be decoded and executed by special logic 235 and 240 of system 200. The special instruction may further include information, such as metadata, that is useful for prefetching the pointer data based on the pointer.

Figure 8:
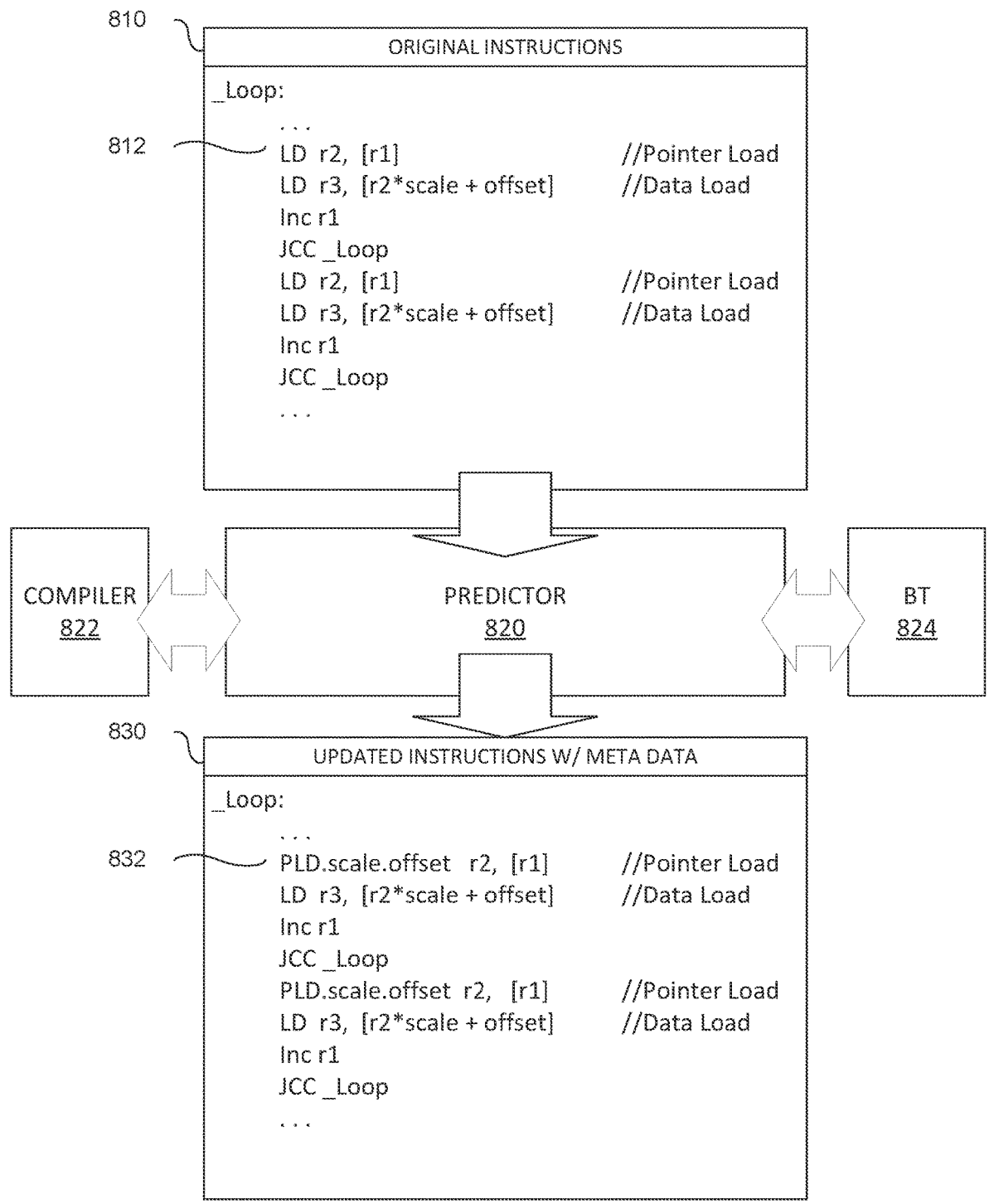
FIG. 8 is a block diagram illustrating the operations performed by a software predictor according to an embodiment.

FIG. 8 is a block diagram illustrating the operations performed by a predictor according to an embodiment. The predictor 820 may be implemented entirely or partially in software. The predictor 820 may include, or is communicatively coupled to, a compiler 822 and/or a binary translator 824. The predictor 820 analyzes program code 810 to identify pointer load instructions and passes this information to one or more prefetchers. In some embodiments, predictor 820 responsively generate an updated program code 830 as part of the analysis. For example, the predictor 820 may replace any load instructions (LD) that has been identified as pointer load instructions with a special pointer load instruction (PLD). For instance, LD instruction 812 in the original program code 810 was identified as a pointer load by the predictor 820. It is therefore replaced by a PLD instruction 832 in the updated program code 830. The PLD instruction 832 may be annotated to include additional information identified by the predictor 820 during the analysis of program code 810. Information, such as scale and offset values, for identifying the target of the subsequent data load may be included in the metadata of the PLD instruction. Alternatively, or in addition to annotating the pointer load instruction with pointer data information, the predictor may store the pointer data information in a separate storage location and create an association between the stored data and the corresponding pointer load instruction. In one embodiment, an association or mapping is maintained between entries in the fill buffer allocated to the pointer load prefetches and the entries in the separate storage location storing the corresponding pointer data information.

Figure 9:
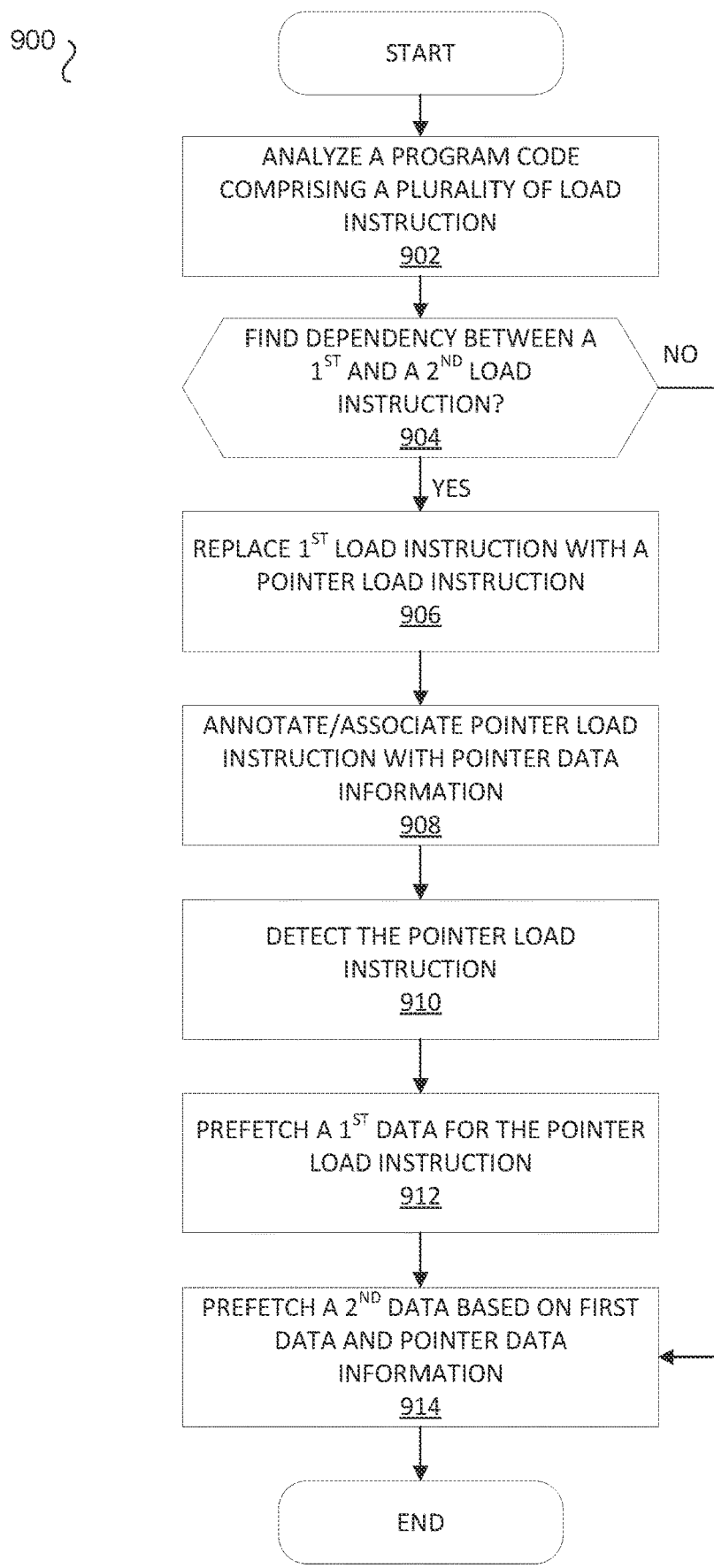
FIG. 9 is a block diagram illustrating a method embodiment for identifying and prefetching pointer-referenced data.

FIG. 9 is a flow diagram illustrating an embodiment of a method for identifying and prefetching pointer and pointer-referenced data. The method 900 may be implemented, for example, in system 200 of FIG. 2. Specifically, method 900 may be implemented by a software predictor (not shown), prefetcher 270, or a combination thereof. Method 900 begins at the start block and continues to block 902 where a predictor, which may be implemented as a software logic or module, analyzes a program code that comprises a plurality of load instructions. At block 904, the predictor analyzes the program code to identify any pointer-data relationship pairs in the program code. A pointer-data relationship pair includes two load instructions, a first load instruction to fetch a pointer and a second load instruction to fetch data from a memory location identified by the pointer. According to an embodiment, the pointer-data relationship can be identified by the dependency between two load instructions. A dependency exists between the two load instructions when the execution of a second load instruction depends on the pointer returned from a first load instruction. If, at block 904, no pointer-data relationship pair can be identified in the program code, the method ends. On the other hand, if a dependency is found, the predictor replaces the first load instruction in the program code with a pointer load instruction at block 906. At block 908, the predictor may annotate the pointer load instruction with pointer data information. At block 910, the generated pointer data instruction may be detected, for instance, by a prefetcher which responsively prefetches a first data for the pointer load instruction at block 912. Moreover, since the prefetcher knows the pointer data information merely contains a pointer to data stored in another memory location, the prefetcher automatically issues a second prefetch request, at block 914, to prefetch a second data based on the first data and the pointer data information associated with the pointer load instruction.

An example of the present invention is a method that includes tracking a plurality of load instructions. Each of the load instructions may include a first load instruction to cause access of a first data which identifies a first memory location. In addition, method includes detecting a second load instruction that is to cause access of a second memory location for a second data such that the second memory location matches the first memory location identified by the first data. Responsive to detecting the second load instruction, the method further includes updating a list of pointer load instructions to include information identifying the first load instruction as a pointer load instruction; detecting a third load instruction; prefetching a third data to be accessed according to the third load instruction prior to an execution of the third load instruction; and identifying the third load instruction as a pointer load instruction based on the information in the list of pointer load instructions. A pointer load instruction is a load instruction that is associated with a pointer for identifying a target memory location. Furthermore, responsive to the identifying, the method includes automatically prefetching a fourth data from a fourth memory location which is identified by the third data. The first data may include the memory address of the first memory location and the third data may include the memory address of the fourth memory location. In one case, the second memory location may match the first memory location if the second memory location and the first memory location have a same memory address. In another case, the second memory location may match the first memory location if the second memory location and the first memory location are located in a same cache line. When updating the list of pointer load instructions to include information identifying the first load instruction as a pointer load instruction, the method may further include adding a program counter associated with the first load instruction to the list of pointer instructions. The program counter may be used to identify the first load instruction and instances of the first load instruction. Moreover, when identifying the third load instruction as a pointer load instruction based on the information in the list of pointer load instructions, the method may further include detecting, in the list of pointer load instructions, a program counter associated with the third load instruction. The first load instruction and the third load instruction may be associated with a same program counter.

Another example of the present invention is an apparatus that includes predictor circuitry and prefetcher circuitry. The predictor circuity may track a plurality of load instructions, each of which may include a first load instruction to cause access of a first data that identifies a first memory location. The predictor circuity may detect a second load instruction that is to cause access of a second memory location for a second data and the second memory location may match the first memory location identified by the first data. Responsive to detecting the second load instruction, the predictor circuity may update a list of pointer load instructions to include information identifying the first load instruction as a pointer load instruction. A pointer load instruction is a load instruction that is associated with a pointer for identifying a target memory location. The predictor circuitry may further detect a third load instruction and identify the third load instruction as a pointer load instruction based on the information in the list of pointer load instructions. As for the prefetcher circuitry, it may prefetch a third data to be accessed according to the third load instruction prior to an execution of the third load instruction. Moreover, responsive to the predictor circuitry identifying the third load instruction as a pointer load instruction, the prefetcher circuitry may automatically prefetch a fourth data from a fourth memory location identified by the third data. The first data may include the memory address of the first memory location and the third data may include the memory address of the fourth memory location. In one case, the second memory location may match the first memory location if the second memory location and the first memory location have a same memory address. In another case, the second memory location may match the first memory location if the second memory location and the first memory location are located in a same cache line. When updating the list of pointer load instructions to include information identifying the first load instruction as a pointer load instruction, the predictor circuitry may add a program counter associated with the first load instruction to the list of pointer instructions. The program counter may be used to identify the first load instruction and instances of the first load instruction. Moreover, when identifying the third load instruction as a pointer load instruction based on the information in the list of pointer load instructions, the predictor circuitry may detect, in the list of pointer load instructions, a program counter associated with the third load instruction. The first load instruction and the third load instruction may be associated with a same program counter.

Another example of the present invention is a method that includes analyzing, such as by a software logic or predictor, a program code and identifying a dependency between a first and a second load instruction in the program code. A dependency may be defined as the execution of the second load instruction requiring a first data accessed by the first load instruction. Responsive to identifying the dependency, the method further includes generating a pointer load instruction to replace the first load instruction in the program code. Moreover, the method may include detecting that the pointer load instruction is to be executed and responsively prefetching the first data for the pointer load instruction and a second data from a memory location based on the first data and information associated with the pointer load instruction. The method may further include storing the information associated with the pointer load instruction in the metadata of the pointer load instruction. The information may include scale and offset values used to calculate the address of the memory location. In one case, the method may also include allocating an entry for the pointer load instruction in a prefetcher and storing the information from the metadata of the pointer load instruction in the allocated entry. In another case, the method may include storing the information in an entry of a data storage structure separate from the prefetcher and associating the entry with a fill buffer entry in a fill buffer, the fill buffer entry storing data received from prefetches associated with the pointer load instruction.

Yet another example of the present invention is a system that includes predictor logic and prefetch circuitry. The predictor logic may analyze a program code that includes a first and a second load instruction and may identify a dependency between the first and the second load instruction. A dependency may be defined as the execution of the second load instruction requiring a first data accessed by the first load instruction. The predictor logic may further generate a pointer load instruction to replace the first load instruction in response to identifying the dependency between the first and the second load instruction. The prefetcher circuitry may detect that the generated pointer load instruction is to be executed and responsively prefetch the first data for the pointer load instruction and a second data from a memory location which is determined based on the first data and information associated with the pointer load instruction. The information associated with the pointer load instruction may be stored in the metadata of the pointer load instruction. The information may include scale and offset values used to calculate the address of the memory location. The prefetcher circuitry may allocate an entry for the pointer load instruction and store the information from the metadata of the pointer load instruction in the allocated entry. The system may also include a fill buffer having a plurality of fill buffer entries to store data received from prefetch requests prior to storing the data into a cache. Moreover, the system may include a storage unit to store the information in an entry and to associate the entry with a fill buffer entry in the fill buffer.

Figure 10:
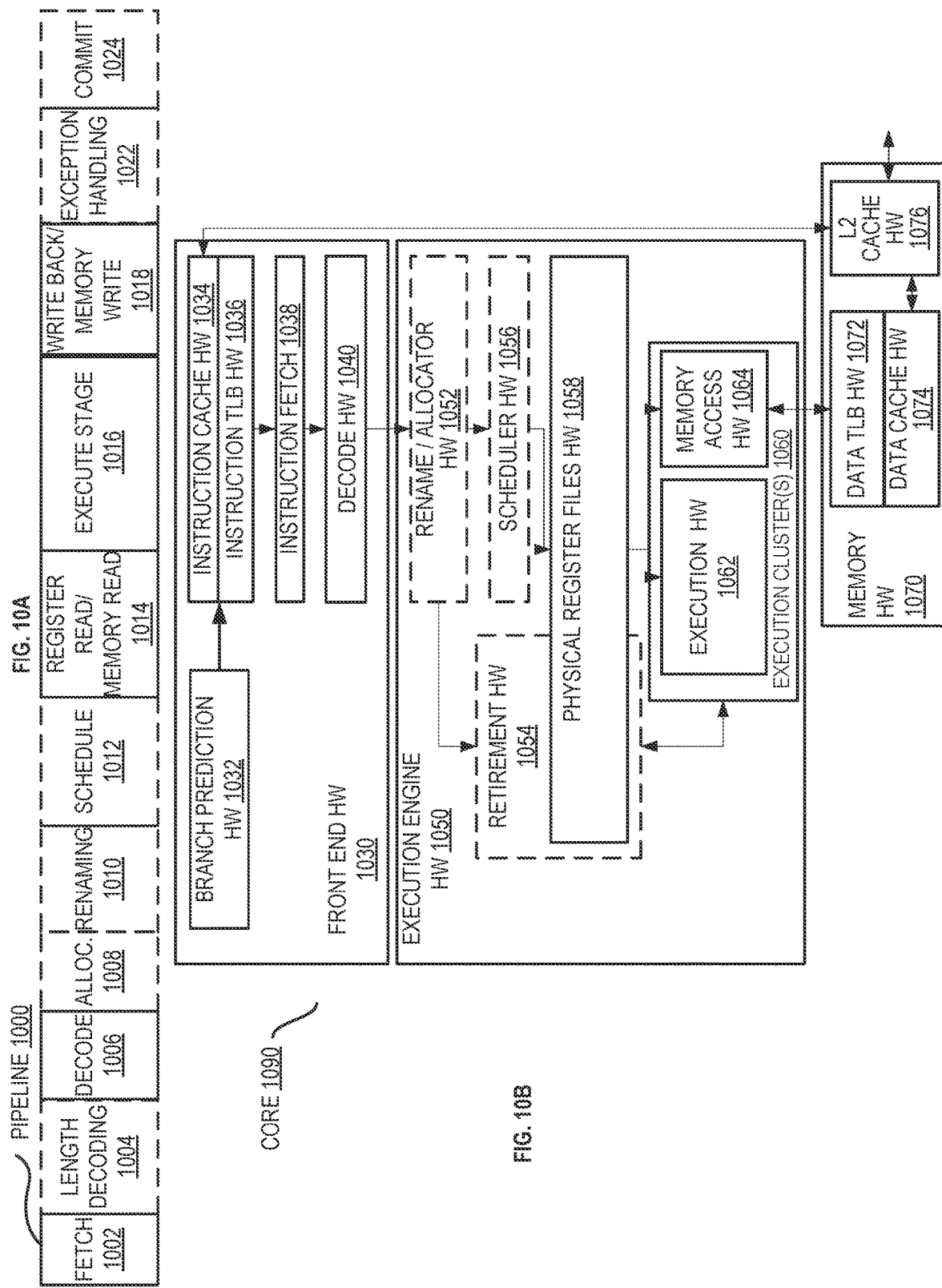
FIG. 10A is a block diagram illustrating both an exemplary in-order pipeline and an exemplary register renaming, out-of-order issue/execution pipeline according to embodiments of the invention.
FIG. 10B is a block diagram illustrating both an exemplary embodiment of an in-order architecture core and an exemplary register renaming, out-of-order issue/execution architecture core to be included in a processor according to embodiments of the invention.

FIG. 10A is a block diagram illustrating both an exemplary in-order pipeline and an exemplary register renaming, out-of-order issue/execution pipeline according to embodiments of the invention. FIG. 10B is a block diagram illustrating both an exemplary embodiment of an in-order architecture core and an exemplary register renaming, out-of-order issue/execution architecture core to be included in a processor according to embodiments of the invention. The solid lined boxes in FIGS. 10A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 10A, a processor pipeline 1000 includes a fetch stage 1002, a length decode stage 1004, a decode stage 1006, an allocation stage 1008, a renaming stage 1010, a scheduling (also known as a dispatch or issue) stage 1012, a register read/memory read stage 1014, an execute stage 1016, a write back/memory write stage 1018, an exception handling stage 1022, and a commit stage 1024.

FIG. 10B shows processor core 1090 including a front end hardware 1030 coupled to an execution engine hardware 1050, and both are coupled to a memory hardware 1070. The core 1090 may be a reduced instruction set computing (RISC) core, a complex instruction set computing (CISC) core, a very long instruction word (VLIW) core, or a hybrid or alternative core type. As yet another option, the core 1090 may be a special-purpose core, such as, for example, a network or communication core, compression engine, coprocessor core, general purpose computing graphics processing unit (GPGPU) core, graphics core, or the like.

The front end hardware 1030 includes a branch prediction hardware 1032 coupled to an instruction cache hardware 1034, which is coupled to an instruction translation lookaside buffer (TLB) 1036, which is coupled to an instruction fetch hardware 1038, which is coupled to a decode hardware 1040. The decode hardware 1040 (or decoder) may decode instructions, and generate as an output one or more microoperations, micro-code entry points, microinstructions, other instructions, or other control signals, which are decoded from, or which otherwise reflect, or are derived from, the original instructions. The decode hardware 1040 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1090 includes a microcode ROM or other medium that stores microcode for certain macroinstructions (e.g., in decode hardware 1040 or otherwise within the front end hardware 1030). The decode hardware 1040 is coupled to a rename/allocator hardware 1052 in the execution engine hardware 1050.

The execution engine hardware 1050 includes the rename/allocator hardware 1052 coupled to a retirement hardware 1054 and a set of one or more scheduler hardware 1056. The scheduler hardware 1056 represents any number of different schedulers, including reservations stations, central instruction window, etc. The scheduler hardware 1056 is coupled to the physical register file(s) hardware 1058. Each of the physical register file(s) hardware 1058 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) hardware 1058 comprises a vector registers hardware, a write mask registers hardware, and a scalar registers hardware. This register hardware may provide architectural vector registers, vector mask registers, and general purpose registers. The physical register file(s) hardware 1058 is overlapped by the retirement hardware 1054 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement hardware 1054 and the physical register file(s) hardware 1058 are coupled to the execution cluster(s) 1060. The execution cluster(s) 1060 includes a set of one or more execution hardware 1062 and a set of one or more memory access hardware 1064. The execution hardware 1062 may perform various operations (e.g., shifts, addition, subtraction, multiplication) and on various types of data (e.g., scalar floating point, packed integer, packed floating point, vector integer, vector floating point). While some embodiments may include a number of execution hardware dedicated to specific functions or sets of functions, other embodiments may include only one execution hardware or multiple execution hardware that all perform all functions. The scheduler hardware 1056, physical register file(s) hardware 1058, and execution cluster(s) 1060 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler hardware, physical register file(s) hardware, and/or execution cluster—and in the case of a separate memory access pipeline, certain embodiments are implemented in which only the execution cluster of this pipeline has the memory access hardware 1064). It should also be understood that where separate pipelines are used, one or more of these pipelines may be out-of-order issue/execution and the rest in-order.

The set of memory access hardware 1064 is coupled to the memory hardware 1070, which includes a data TLB hardware 1072 coupled to a data cache hardware 1074 coupled to a level 2 (L2) cache hardware 1076. In one exemplary embodiment, the memory access hardware 1064 may include a load hardware, a store address hardware, and a store data hardware, each of which is coupled to the data TLB hardware 1072 in the memory hardware 1070. The instruction cache hardware 1034 is further coupled to a level 2 (L2) cache hardware 1076 in the memory hardware 1070. The L2 cache hardware 1076 is coupled to one or more other levels of cache and eventually to a main memory.

By way of example, the exemplary register renaming, out-of-order issue/execution core architecture may implement the pipeline 1000 as follows: 1) the instruction fetch 1038 performs the fetch and length decoding stages 1002 and 1004; 2) the decode hardware 1040 performs the decode stage 1006; 3) the rename/allocator hardware 1052 performs the allocation stage 1008 and renaming stage 1010; 4) the scheduler hardware 1056 performs the schedule stage 1012; 5) the physical register file(s) hardware 1058 and the memory hardware 1070 perform the register read/memory read stage 1014; the execution cluster 1060 perform the execute stage 1016; 6) the memory hardware 1070 and the physical register file(s) hardware 1058 perform the write back/memory write stage 1018; 7) various hardware may be involved in the exception handling stage 1022; and 8) the retirement hardware 1054 and the physical register file(s) hardware 1058 perform the commit stage 1024.

The core 1090 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1090 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache hardware 1034/1074 and a shared L2 cache hardware 1076, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 11:
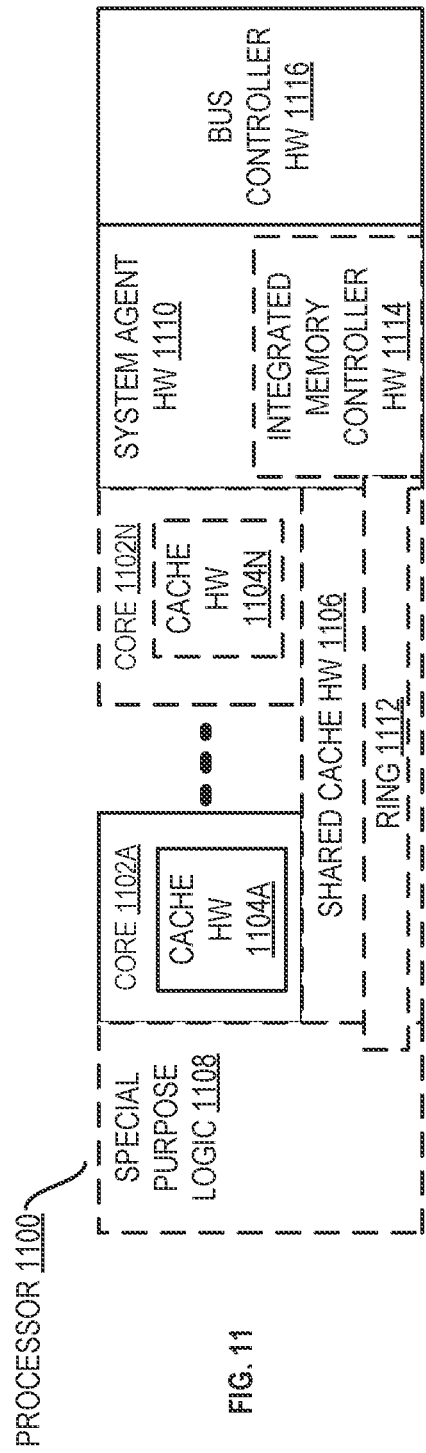
FIG. 11 is a block diagram of a single core processor and a multicore processor with integrated memory controller and graphics according to embodiments of the invention.

FIG. 11 is a block diagram of a processor 1100 that may have more than one core, may have an integrated memory controller, and may have integrated graphics according to embodiments of the invention. The solid lined boxes in FIG. 11 illustrate a processor 1100 with a single core 1102A, a system agent 1110, a set of one or more bus controller hardware 1116, while the optional addition of the dashed lined boxes illustrates an alternative processor 1100 with multiple cores 1102A-N, a set of one or more integrated memory controller hardware 1114 in the system agent hardware 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache hardware 1106, and external memory (not shown) coupled to the set of integrated memory controller hardware 1114. The set of shared cache hardware 1106 may include one or more mid-level caches, such as level 2 (L2), level 3 (L3), level 4 (L4), or other levels of cache, a last level cache (LLC), and/or combinations thereof. While in one embodiment a ring based interconnect hardware 1112 interconnects the integrated graphics logic 1108, the set of shared cache hardware 1106, and the system agent hardware 1110/integrated memory controller hardware 1114, alternative embodiments may use any number of well-known techniques for interconnecting such hardware. In one embodiment, coherency is maintained between one or more cache hardware 1106 and cores 1102A-N.

In some embodiments, one or more of the cores 1102A-N are capable of multi-threading. The system agent 1110 includes those components coordinating and operating cores 1102A-N. The system agent hardware 1110 may include for example a power control unit (PCU) and a display hardware. The PCU may be or include logic and components needed for regulating the power state of the cores 1102A-N and the integrated graphics logic 1108. The display hardware is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set. In one embodiment, the cores 1102A-N are heterogeneous and include both the "small" cores and "big" cores described below.

FIGS. 12-15 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 12:
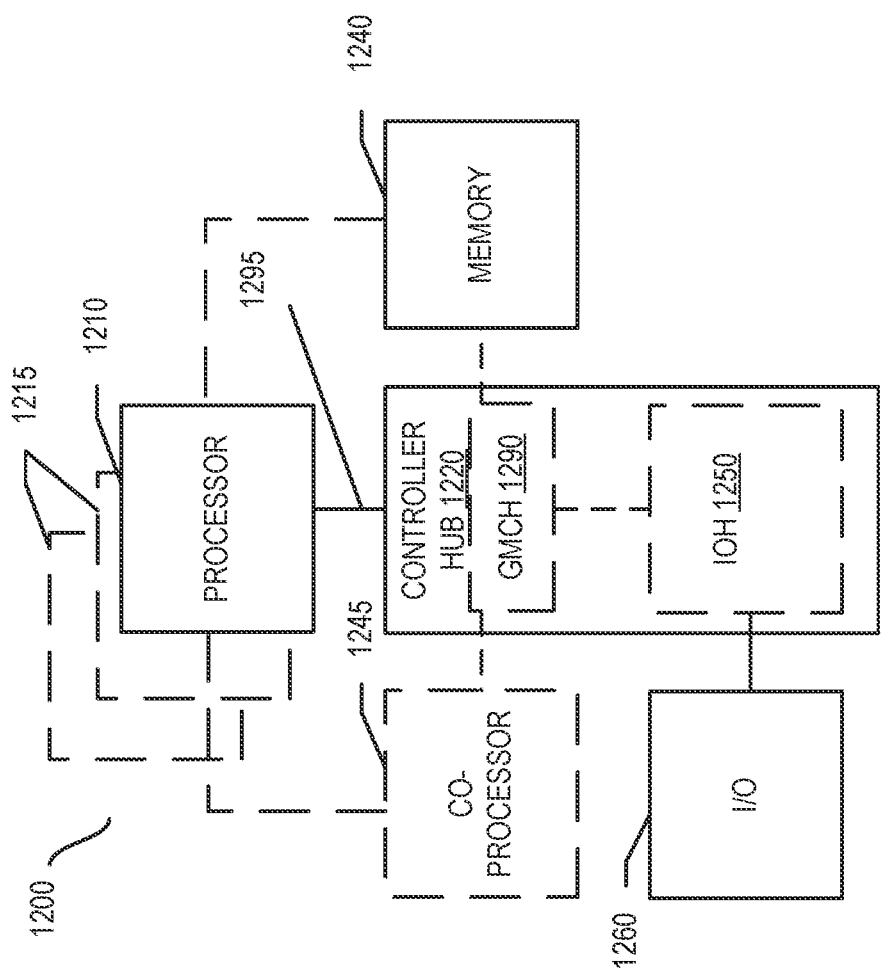
FIG. 12 illustrates a block diagram of a system in accordance with one embodiment of the present invention.

Referring now to FIG. 12, shown is a block diagram of a system 1200 in accordance with one embodiment of the present invention. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 is couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250.

The optional nature of additional processors 1215 is denoted in FIG. 12 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface, or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 13:
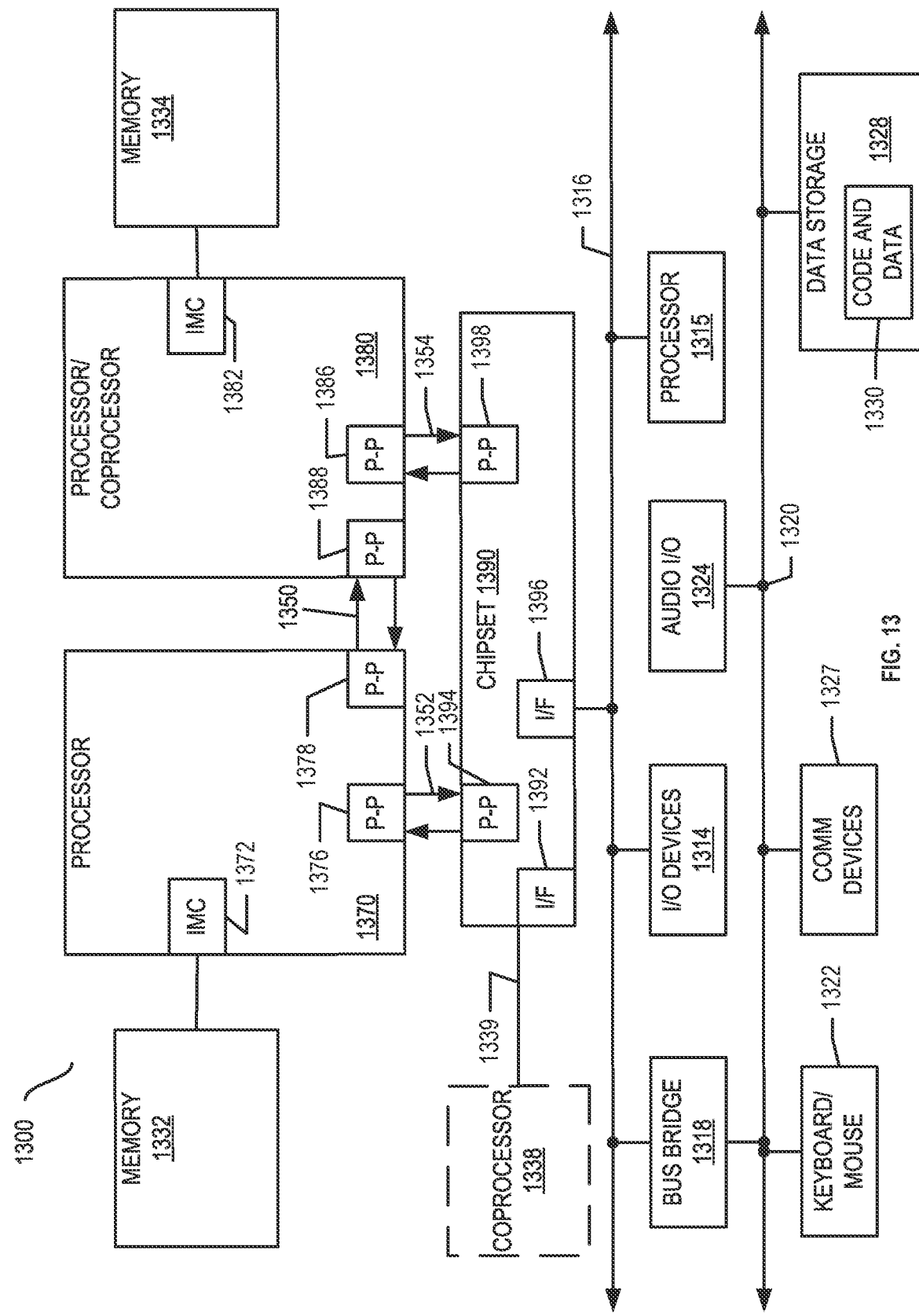
FIG. 13 illustrates a block diagram of a second system in accordance with an embodiment of the present invention.

Referring now to FIG. 13, shown is a block diagram of a first more specific exemplary system 1300 in accordance with an embodiment of the present invention. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the invention, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) hardware 1372 and 1382, respectively. Processor 1370 also includes as part of its bus controller hardware point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 13, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) hardware), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage hardware 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 13, a system may implement a multi-drop bus or other such architecture.

Figure 14:
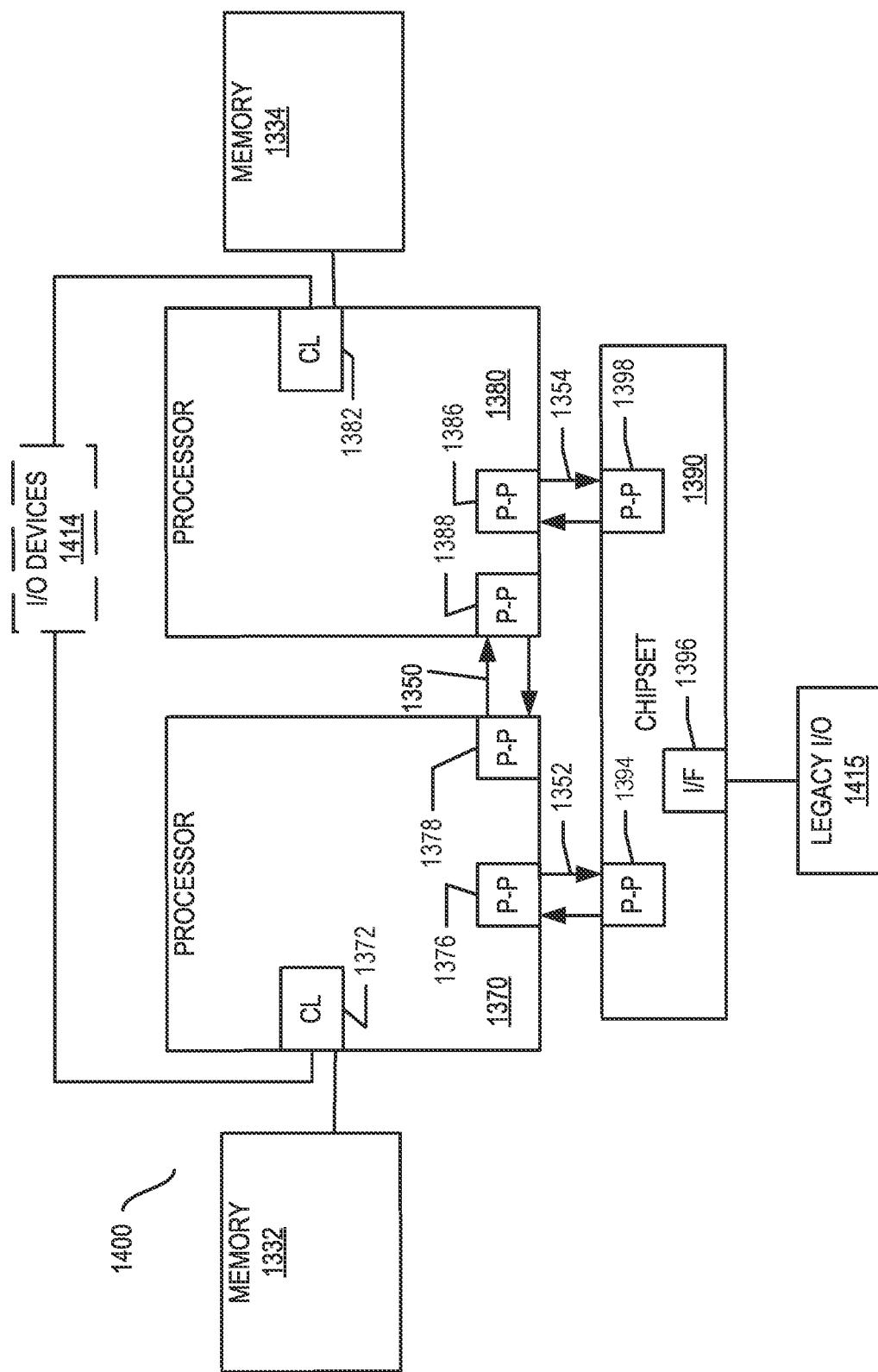
FIG. 14 illustrates a block diagram of a third system in accordance with an embodiment of the present invention.

Referring now to FIG. 14, shown is a block diagram of a second more specific exemplary system 1400 in accordance with an embodiment of the present invention. Like elements in FIGS. 13 and 14 bear like reference numerals, and certain aspects of FIG. 13 have been omitted from FIG. 14 in order to avoid obscuring other aspects of FIG. 14.

FIG. 14 illustrates that the processors 1370, 1380 may include integrated memory and I/O control logic ("CL") 1372 and 1382, respectively. Thus, the CL 1372, 1382 include integrated memory controller hardware and include I/O control logic. FIG. 14 illustrates that not only are the memories 1332, 1334 coupled to the CL 1372, 1382, but also that I/O devices 1414 are also coupled to the control logic 1372, 1382. Legacy I/O devices 1415 are coupled to the chipset 1390.

Figure 15:
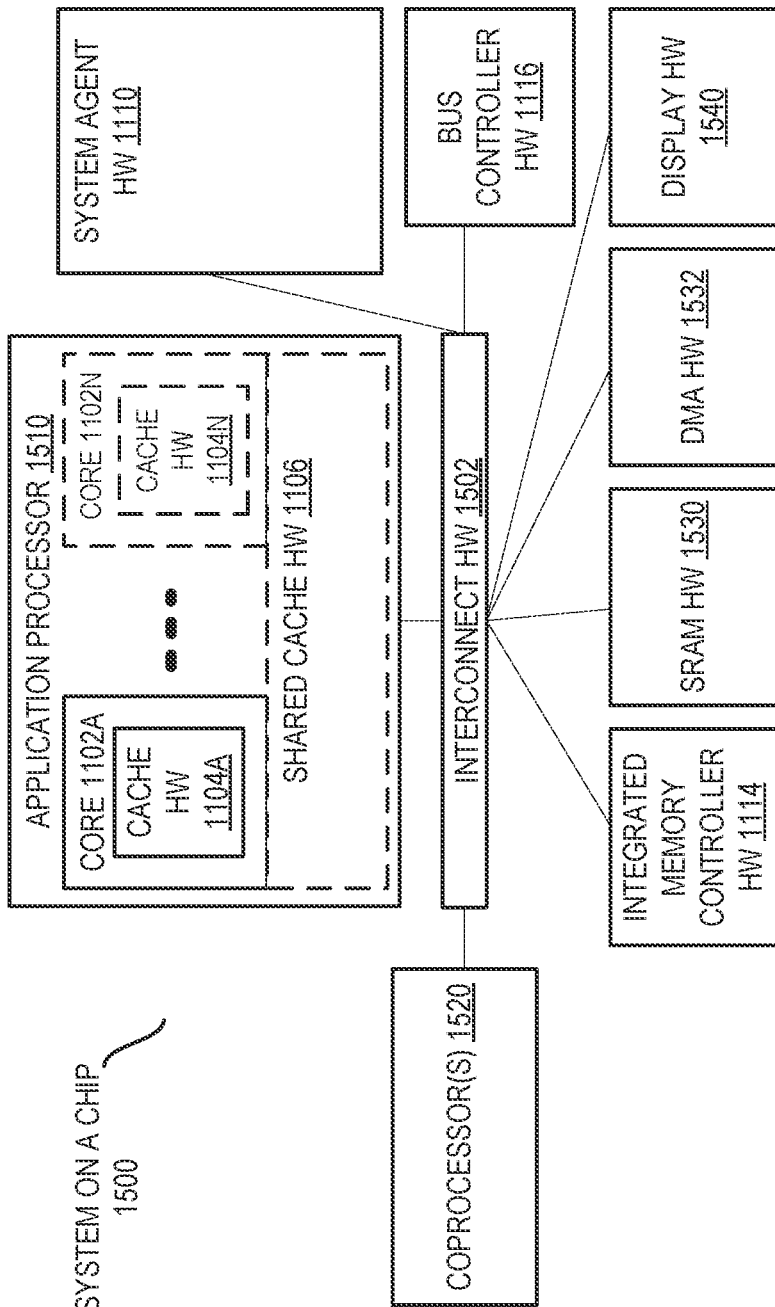
FIG. 15 illustrates a block diagram of a system on a chip (SoC) in accordance with an embodiment of the present invention.

Referring now to FIG. 15, shown is a block diagram of a SoC 1500 in accordance with an embodiment of the present invention. Similar elements in FIG. 11 bear like reference numerals. Also, dashed lined boxes are optional features on more advanced SoCs. In FIG. 15, an interconnect hardware 1502 is coupled to: an application processor 1510 which includes a set of one or more cores 1102A-N and shared cache hardware 1106; a system agent hardware 1110; a bus controller hardware 1116; an integrated memory controller hardware 1114; a set or one or more coprocessors 1520 which may include integrated graphics logic, an image processor, an audio processor, and a video processor; an static random access memory (SRAM) hardware 1530; a direct memory access (DMA) hardware 1532; and a display hardware 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 16 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 16 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 16 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method comprising:

identifying a first load instruction to load a first data as a pointer load instruction based on one or more previously executed data load instructions associated with the first load instruction, wherein each previously executed data load instruction caused access to a second memory address that is different from, but located in a same cache line as, a first memory address identified by the first data; and detecting an upcoming execution of the first load instruction and responsively prefetching the first data for the first load instruction and a second data for a next data load instruction associated with the first load instruction, wherein a location of the second data is identified based on the first data and the second data prefetched prior to an execution of the next data load instruction.

2. The method of claim 1, further comprising:

tracking a number of previously executed data load instruction associated with the first load instruction.

3. The method of claim 2, further comprising:

incrementing a counter for each previously executed data load instruction associated with the first load instruction.

4. The method of claim 3, further comprising:

identifying the first load instruction as a data load instruction when a counter value of the counter exceeds a specified threshold.

5. The method of claim 3, further comprising:

decrementing the counter after each specified number of clock cycles.

6. An apparatus comprising:

predictor circuitry to identify a first load instruction to load a first data as a pointer load instruction based on one or more previously executed data load instructions associated with the first load instruction, wherein each previously executed data load instruction caused access to a second memory address that is different from, but located in a same cache line as, a first memory address identified by the first data; and prefetcher circuitry to detect an upcoming execution of the first load instruction and responsively prefetch the first data for the first load instruction and a second data for a next data load instruction associated with the first load instruction, wherein a location of the second data is identified based on the first data and the second data prefetched prior to an execution of the next data load instruction.

7. The apparatus of claim 6, further comprising storage circuitry to track a number of previously executed data load instruction associated with the first load instruction.

8. The apparatus of claim 7, wherein a counter of the storage circuitry is incremented for each previously executed data load instruction associated with the first load instruction.

9. The apparatus of claim 8, wherein the predictor circuitry is to identify the first load instruction as a data load instruction when a counter value of the counter exceeds a specified threshold.

10. The apparatus of claim 8, further comprising a timer to track clock cycles and wherein the counter is decremented after each specified number of clock cycles.

11. A non-transitory machine-readable medium having program code stored thereon which, when executed by a machine, causes the machine to perform operations of:
identifying a first load instruction to load a first data as a pointer load instruction based on one or more previously executed data load instructions associated with the first load instruction, wherein each previously executed data load instruction caused access to a second memory address that is different from, but located in a same cache line as, a first memory address identified by the first data; and
detecting an upcoming execution of the first load instruction and responsively prefetching the first data for the first load instruction and a second data for a next data load instruction associated with the first load instruction, wherein a location of the second data is identified based on the first data and the second data prefetched prior to an execution of the next data load instruction.

12. The non-transitory machine-readable of claim 11, wherein the operations further comprise:
tracking a number of previously executed data load instruction associated with the first load instruction.

13. The non-transitory machine-readable of claim 12, wherein the operations further comprise:
incrementing a counter for each previously executed data load instruction associated with the first load instruction.

14. The non-transitory machine-readable of claim 13, wherein the operations further comprise:
identifying the first load instruction as a data load instruction when a counter value of the counter exceeds a specified threshold.

15. The non-transitory machine-readable of claim 13, wherein the operations further comprise:
decrementing the counter after each specified number of clock cycles.

16. A method comprising:
identifying a first load instruction to load a first data as a pointer load instruction based on one or more previously executed data load instructions associated with the first load instruction, wherein each previously executed data load instruction caused access to a second memory address located in a same cache line as a first memory address identified by the first data;
tracking a number of previously executed data load instruction associated with the first load instruction by incrementing a counter for each previously executed data load instruction associated with the first load instruction and decrementing the counter after each specified number of clock cycles; and
detecting an upcoming execution of the first load instruction and responsively prefetching the first data for the first load instruction and a second data for a next data load instruction associated with the first load instruction, wherein a location of the second data is identified based on the first data and the second data prefetched prior to an execution of the next data load instruction.

17. An apparatus comprising:
predictor circuitry to identify a first load instruction to load a first data as a pointer load instruction based on one or more previously executed data load instructions associated with the first load instruction, wherein each previously executed data load instruction caused access to a second memory address located in a same cache line as a first memory address identified by the first data;
storage circuitry to track a number of previously executed data load instruction associated with the first load instruction, wherein a counter of the storage circuitry is incremented for each previously executed data load instruction associated with the first load instruction and decremented after each specified number of clock cycles; and
prefetcher circuitry to detect an upcoming execution of the first load instruction and responsively prefetch the first data for the first load instruction and a second data for a next data load instruction associated with the first load instruction, wherein a location of the second data is identified based on the first data and the second data prefetched prior to an execution of the next data load instruction.

18. A non-transitory machine-readable medium having program code stored thereon which, when executed by a machine, causes the machine to perform operations of:
identifying a first load instruction to load a first data as a pointer load instruction based on one or more previously executed data load instructions associated with the first load instruction, wherein each previously executed data load instruction caused access to a second memory address located in a same cache line as a first memory address identified by the first data;
tracking a number of previously executed data load instruction associated with the first load instruction by incrementing a counter for each previously executed data load instruction associated with the first load instruction and decrementing the counter after each specified number of clock cycles; and
detecting an upcoming execution of the first load instruction and responsively prefetching the first data for the first load instruction and a second data for a next data load instruction associated with the first load instruction, wherein a location of the second data is identified based on the first data and the second data prefetched prior to an execution of the next data load instruction.

\* \* \* \* \*